United States Patent Office 3,428,681
Patented Feb. 18, 1969

3,428,681
N-HALOTRICHLOROACETAMIDINES
Perry R. Kippur and Randal E. Bailey, Orange, Conn., assignors, by mesne assignments, to The Ansul Company, a corporation of Wisconsin
No Drawing. Filed Sept. 1, 1966, Ser. No. 576,539
U.S. Cl. 260—564
Int. Cl. C07c *129/08*; A61k *27/00*
3 Claims This invention relates to N-halotrichloroacetamidines having the following general formula:

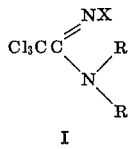

I wherein X is iodine, chlorine or bromine and each R is independently selected from the group consisting of hydrogen, alkyl, aryl, cycloalkyl and heterocyclic.

Various substituted acetamidines have been previously prepared and described in the literature. For example, the preparation of N-chloroacetamidine by the treatment of cold acetamidine hydrochloride with sodium hypochlorite has been disclosed by J. Goerdeler et al. in Chem. Ber. 86, 400–3 (1953). However, this compound is unstable, decomposing and turning red in a closed container under ambient conditions and exploding when heated rapidly, as discussed in the above-cited reference. German Patent 671,785 describes the reaction of trichloroacetonitrile and ammonia to provide 2,2,2-trichloroacetamidine, a substituted acetamidine having chlorine atoms bound to a carbon atom. This compound is also unstable, decomposing rapidly upon exposure to U.V. light at room temperature, and decomposing gradually in the absence of light.

Now it has been found that a series of N-halotrichloroacetamidines having the Formula I can be conveniently prepared by selective halogenation of the corresponding trichloroacetamidine compound. The novel compounds of this invention are unique in that they contain both available halogen and chlorine bound to a carbon atom, thereby rendering them useful for a wide variety of applications. Furthermore, in contrast to the previously-mentioned substituted acetamidines, they are surprisingly stable, and thus are suitable in applications where prolonged storage under varying conditions is desirable.

The Compounds I are provided in high yield and excellent purity by halogenating trichloroacetamidines in accordance with the following equation wherein R and X are as previously described.

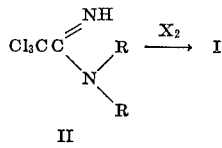

II

The trichloroacetamidines II are readily provided by reacting trichloroacetonitrile with ammonia or a primary or secondary amine in accordance with known techniques. Thus, the treatment of trichloroacetonitrile with ammonia as previously described provides 2,2,2-trichloroacetamidine. J. C. Grives et al., in Can. J. Chem. 36, 771–4 (1958) describe the preparation of substituted trichloroacetamidines II by the reaction of trichloroacetonitrile with a wide variety of primary and secondary amines, including aliphatic, heterocyclic, cycloalkyl and aromatic amines. Illustrative primary amines which have been used in the preparation of compounds II are methylamine, ethylamine, n-propylamine, isopropylamine, n-butylamine, n-amylamine, n-octylamine, stearylamine, cyclohexylamine, aniline, ethoxyphenylamine, tolylamine, xylylamine, naphthylamine, benzylamine, piperidylamine and morpholylamine. Suitable secondary amines include dimethylamine, diethylamine, methylethylamine, dibutylamine, diphenylamine and dinaphthylamine.

While any of the previously-described trichloroacetamidines represented by the Formula II can be employed in the preparation of the compounds of this invention, preferred embodiments utilize those trichloroacetamidines wherein each R is independently selected from the group consisting of hydrogen; alkyl having from 1 to 8 carbon atoms, i.e., methyl, amyl, octyl and the like; aryl having from 6 to 10 carbon atoms, i.e., phenyl, xylyl, tolyl, napthyl, etc.; and benzyl.

The halogenation of the trichloroacetamidine II is conveniently carried out in the presence of an inert solvent. Illustrative of the suitable solvents are the chlorinated aliphatic hydrocarbons such as methylene dichloride, chloroform, carbon tetrachloride, and the like.

While the reaction can be carried out over a temperature range from about —10° to 40° C., a temperature between about 0° and 30° C. is preferably employed. In the preferred process embodiments, a hydrogen halide acceptor such as an alkali metal hydroxide or a tertiary amine is added to the trichloroacetamidine medium prior to the chlorination. However, satisfactory yields are obtained in the absence of such a material. After completion of the reaction, the desired N-halotrichloroacetamidine I is isolated from the reaction mixture by conventional techniques, such as filtration, centrifuging and the like.

The N-halotrichloroacetamidines of this invention have a wide variety of useful applications. They are valuable bleaches and disinfectants, liberating halogen in aqueous media. For example, they are effective bleaches for many textiles, including cotton and synthetic fabrics, and are also useful as swimming pool germicides. When compounded with extenders, abrasives and the like, these N-halotrichloroacetamidines are effective scouring agents.

These compounds are also useful agricultural chemicals, having particularly effective fungicidal, herbicidal and algaecidal properties. They are generally mixed with various adjuvants in these applications, and low concentrations of the compounds are extremely effective. For example, it has been found that these compounds are effective both as soil and foliar fungicides against a wide variety of plant pathogenic fungi. Thus, a gel containing 100 p.p.m. of N',2,2,2-tetrachloroacetamidine was essentially completely effective in preventing germination of Rhizoctonia solani spores, a soil-borne fungus harmful to a wide variety of economic crops, such as cotton, vegetables, potatoes, turf grass and the like.

The N-halotrichloroacetamidines I are also effective herbicides, both in preemergence and postemergence applications. Thus, when applied to the soil in preemergence applications and to the foilage in postemergence applications, N',2,2,2-tetrachloroacetamidine killed 95 percent of the emerged broadleaf weeds, i.e., mustard and pigweed, and grasses i.e., ryegrass and crabgrass, and effected 80 percent preemergence weed control.

The algaecidal effectiveness of these compounds has also been demonstrated. For instance, at a concentration of 2.5 p.p.m. in aqueous solution, N',2,2,2-tetrachloroacetamidine was effective as an aquatic herbicide in inhibiting duckweed and the algae Chlorella, Scenedesmus, Phormidium and Oscillatonia.

The following example will serve to illustrate the preparation of an N-halotrichloroacetamidine in accordance with the practice of this invention.

EXAMPLE

In accordance with the procedure described in German Patent 671,785, trichloroacetamidine was prepared in a 5 liter reaction flask by reacting trichloroacetonitrile (578 grams) with ammonia (539 grams).

Methylene dichloride (2,000 grams) was added to the reaction flask at room temperature and the mixture stirred to dissolve the trichloroacetamidine. A solution of 162 grams of sodium hydroxide in 1460 ml. of water was added to the trichloroacetamidine solution and the reaction flask cooled with tap water while stirring the heterogeneous reaction mixture vigorously. When the temperature had fallen to 13° C., the addition of chlorine was initiated. Over a period of one hour, 180 grams of chlorine were added and the reaction mixture separated into two liquid phases. The phases were separated and substantially all the methylene dichloride stripped at 25° C. under water aspirator vacuum in a 2 liter 3-neck flask equipped with an agitator. The resulting slurry was centrifuged to provide 591 grams (76% yield) of a dry cake melting at 48–50° C. The product was purified by distillation at 66.0° C./.05 mm. Hg. The following analytical data revealed that N',2,2,2-tetrachloroacetamidine had been obtained.

Analysis calculated for $C_2H_2N_2Cl_4$: C, 12.25; H, 1.05; N, 14.3; Cl, 72.4. Found: C, 12.57; H, 1.2; N, 14.0; Cl, 72.0.

Mass spectral analysis of a sample of the product showed the presence of a molecular ion at m/e 194, corresponding to the molecular weight of N',2,2,2-tetrachloroacetamidine.

Infrared analysis showed a doublet in the N—H stretching region. A strong absorbance at 1,550 cm.$^{-1}$ shifted down to 1,155 cm.$^{-1}$ upon deuteration of the product, indicating the presence of an $NH_2$ group.

Nuclear magnetic resonance confirmed the structure of the product.

What is claimed is:
1. A compound having the formula:

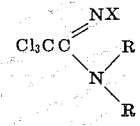

wherein X is iodine, chlorine or bromine and each R is independently selected from the group consisting of hydrogen, alkyl having from 1 to 8 carbon atoms, aryl having from 6 to 10 carbon atoms and benzyl.

2. The compound of claim 1 wherein X is chlorine and each R is independently selected from the group consisting of hydrogen or alkyl having from 1 to 8 carbon atoms.

3. The compound of claim 2 having the name N',2,2,2-tetrachloroacetamidine.

References Cited

Goerdeler et al., Berichte, vol. 86, 400–3 (1953).
Robin, Comptes Rendus (Academie Des Sciences), vol. 177, pp. 1304–6 (1923).

CHARLES B. PARKER, *Primary Examiner.*

L. C. MARUZO, *Assistant Examiner.*

U.S. Cl. X.R.

424—326; 260—290, 247.5; 71—67, 88, 94, 121; 8—107; 51—293; 252—155